Figure 1:
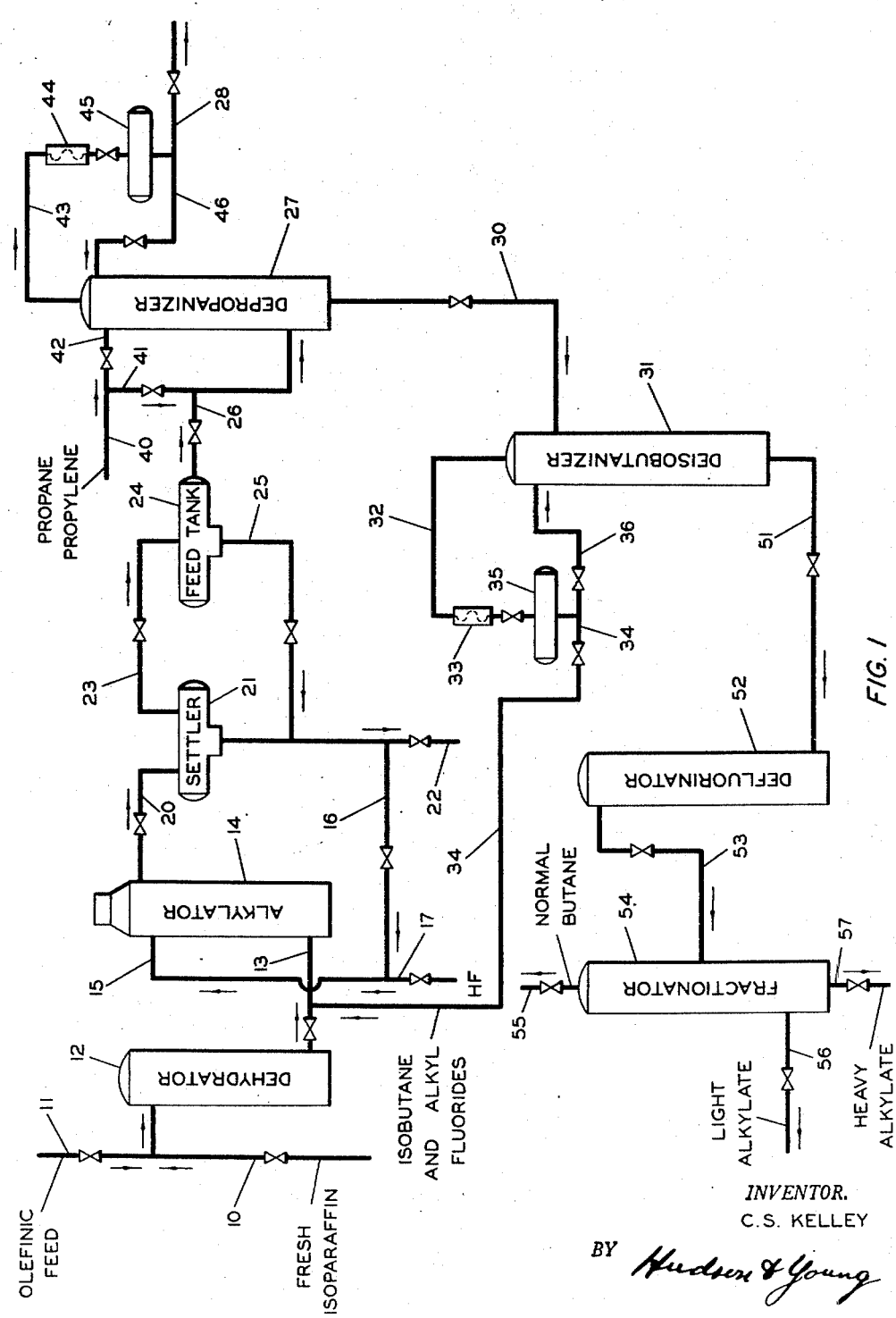

Feb. 20, 1951 C. S. KELLEY 2,542,927
METHOD OF OPERATING AN H F ALKYLATION UNIT
Filed March 21, 1947 3 Sheets-Sheet 3

INVENTOR.
C.S. KELLEY
BY Hudson & Young
ATTORNEYS

Patented Feb. 20, 1951

2,542,927

UNITED STATES PATENT OFFICE 2,542,927

METHOD OF OPERATING AN HF ALKYLATION UNIT

Carl S. Kelley, Bartlesville, Okla., assignor to Phillips Petroleum Company, a corporation of Delaware Application March 21, 1947, Serial No. 736,177

5 Claims. (Cl. 260—683.4)

This invention relates to the conversion of hydrocarbons in the presence of hydrogen fluoride. In one generic embodiment it relates to an improved process for the reaction of a low-boiling alkylatable organic compound with an alkylating reactant in the presence of a hydrogen fluoride alkylation catalyst to produce alkyl organic compounds of higher molecular weight. In a preferred embodiment it is concerned with a combination of related and cooperative steps whereby the process may be operated more efficiently. In another preferred embodiment it relates to the introduction of propylene into such an alkylation process without concomitant introduction of accompanying propane into the alkylation reactor. In another embodiment it relates to the separation of hydrocarbons in the presence of hydrogen fluoride. This application is a continuation-in-part of my copending application Serial No. 651,963, Patent No. 2,448,601, filed March 4, 1946.

The reaction of a low-boiling alkylatable organic compound, especially an isoparaffin, a cycloparaffin, or an aromatic compound such as benzene and its homologues and analogues, phenol and its homologues and analogues, with an olefin, or other alkylating reactant, such as an alkyl halide, an alcohol, or the like, in the presence of liquid hydrofluoric acid as a catalyst has found wide use as a method of producing higher-boiling derivatives, especially hydrocarbons boiling in the motor fuel range and having highly desirable characteristics for use as ingredients of premium motor fuels. Hydrogen fluoride is slightly soluble in resulting products and, as a result, the effluents of such an alkylation process, after physical separation of the bulk of the hydrofluoric acid catalyst, contain a smaller or larger amount of dissolved hydrogen fluoride, depending on the solubility of the hydrogen fluoride in the products. This hydrogen fluoride is present in an amount between about 0.2 and about 5 per cent by weight of paraffinic hydrocarbon effluents, and the amount is greater with other products, especially with aromatic products. If such effluents are partially in vapor phase the vapors will likewise contain similar small amounts of hydrogen fluoride. In most commercial plants wherein such a process is practiced, it is a preferred procedure to pass such effluents directly to a fractional distillation column wherein such accompanying hydrogen fluoride is substantially completely removed as a constituent of a low-boiling fraction. As disclosed in Frey 2,322,800, issued June 29, 1943, hydrogen fluoride forms minimum-boiling azeotropic mixtures with low-boiling paraffin hydrocarbons, such as propane and either of the butanes, which are almost invariably present when any of these compounds are reacted with low-boiling olefins. Although the overhead product from such a distillation column generally contains a somewhat higher amount of paraffin hydrocarbon than is theoretically necessary to form such an azeotropic mixture, such a distillation is based upon the characteristics of this azeotropic mixture and such a column is generally referred to as an "azeo tower." The kettle product from such an azeo tower contains substantially all of the higher-boiling components of the reaction effluents and is substantially free from free hydrogen fluoride. This mixture, either with or without a treatment to remove organic fluorine compounds, is passed to subsequent fractional distillation columns, the first of which, when alkylating isobutane, is generally a deisobutanizer for removing, for recycling to the alkylation step, unreacted isobutane. In those instances where propane has been introduced into the process as a contaminant or has been produced in the process, as is often the case with certain alkylating reactants, a portion of the isobutane stream is passed to a depropanizer which removes propane and maintains its concentration in the system at a satisfactorily low value.

I have now found that I can effect a somewhat simpler operation by eliminating the so-called "azeo tower" and promptly reacting the hydrogen fluoride present in such reaction effluents with an olefin hydrocarbon which serves as an alkylating reactant. When an olefinic material is used as a reactant in a process the olefin, or olefins, contained therein are almost always accompanied by corresponding and/or closely related paraffin hydrocarbons which often are inert under the reaction conditions. As a result, it is necessary to separate such paraffin hydrocarbons from reaction effluents regardless of the point in the process at which such an olefinic material is introduced. It is a feature of my invention that I employ a low-boiling olefin as at least a part or portion of the alkylating reactant and introduce at least a sufficient part of such a low-boiling olefin, into admixture with reaction effluents undergoing separation by fractional distillation, that free hydrogen fluoride present in such reactants is reacted with said olefin to form alkyl fluoride, paraffin hydrocarbons accompanying such olefins are eliminated, and resulting alkyl fluoride is passed to the reaction zone, preferably along with recycled unreacted alkylatable compound. In this procedure, and with one operation, reaction effluents from an alkylation process are freed from accompanying hydrogen fluoride and both an olefin used as an alkylating reactant and reaction effluents are free from low-boiling paraffin hydrocarbons which are relatively inert under the alkylation reaction conditions.

It is an object of my invention to improve the operation of a process for reacting a low-boiling alkylatable compound with an alkylating reactant.

It is also an object of my invention to improve the operation of a process for reacting a low-boiling isoparaffin with an alkylating reactant.

It is another object of my invention to introduce propylene into an alkylation system without introducing into the alkylation zone a large amount of accompanying propane.

Still another object of my invention is to remove propane from an alkylation process wherein hydrogen fluoride is employed as a catalyst without removing hydrogen fluoride from the system at the same time.

A further object of my invention is to free low-boiling olefins from higher-boiling olefins.

Further objects and advantages of my invention will become apparent, to one skilled in the art, from the accompanying disclosure and discussion.

My invention will be practiced primarily in connection with the alkylation of isobutane with low-boiling olefins, such as butylenes and/or amylenes. However, in many cases it will be possible to apply the features of my invention to the reaction of other low-boiling alkylatable compounds, especially the isoparaffins, particularly isopentane, and low-boiling aromatics such as benzene, toluene and phenol, and cyclo paraffins such as cyclohexane, and to apply the features of the invention when other alkylating reactants are employed, such as higher-boiling olefin hydrocarbons whether those are produced by polymerization or are produced by other means, such as cracking or dehydrogenation, and also when other alkylating reactants such as alkyl halides, alcohols and similar alkyl compounds are used.

My invention will now be further described and discussed in connection with the accompanying drawings which form a part of this application and which show diagrammatically, in Figures 1, 2 and 3, by means of flow sheets, various arrangements of apparatus suitable for use in practicing preferred specific embodiments of my invention. These embodiments are conveniently illustrated by reference to alkylation of an isoparaffin.

Referring now to Figure 1, a paraffinic hydrocarbon stream having a high content of isoparaffin to be alkylated is introduced through line 10 and a stream comprising olefins to be reacted therewith is introduced through line 11. In practice material entering through line 10 will generally comprise 90 to 98 per cent of a low-boiling isoparaffin, such as isobutane and/or isopentane. The stream added through line 11 can be a butane-butene mixture, such as is often available in a refinery from effluents of a cracking operation. In some instances it may also contain amylenes and/or some propylene, although, as is evident from the present disclosure, when it is desired to react propylene at least a portion thereof will be added to the system at a different point, as will be more fully discussed hereinafter. When olefinic polymers are available for reaction with a low-boiling isoparaffin, they may also be included in the feed passing through line 11 or in some instances may constitute the sole or main part of the olefins. Since most of these streams will contain some dissolved water they are combined and passed through dehydrator 12, which contains a suitable dehydrating agent such as alumina, bauxite, silica gel, calcium chloride, or the like. The dehydrated effluents pass through line 13, together with recycle isoparaffin returned through line 34, to alkylator 14 wherein they are intimately admixed with a hydrofluoric acid alkylation catalyst. This catalyst is introduced to alkylator 14 through line 15 and in commercial operations will comprise a major portion of recycled catalyst, which is returned to the process through line 16, and some fresh hydrofluoric acid introduced through line 17. The reactants are treated under alkylation conditions well known to the art, such as a reaction time of about 5 to about 20 minutes, a ratio of hydrocarbons to hydrofluoric acid between about 2:1 and 1:2, a reaction temperature between about 70 and about 120° F., and a pressure sufficient to maintain the reactants substantially entirely in liquid phase.

The physical mixture of hydrofluoric acid catalyst and hydrocarbons, containing unreacted paraffin hydrocarbons and products of the alkylation reactions, is passed from alkylator 14 through line 20 to settler 21, which is usually maintained at about the same temperature and pressures as alkylator 14. In this settler liquid hydrofluoric acid settles as a heavy liquid phase leaving a hydrocarbon phase which is substantially free from hydrogen fluoride, except for that material which is dissolved in the hydrocarbons or otherwise entrained therein, in an amount between about 0.2 and about 5 per cent thereof. The hydrofluoric acid phase is withdrawn through line 16 and a major portion of it is recycled as previously discussed. Since this material tends to have accumulated in it small amounts of water and various organic impurities of high molecular weight, a portion is generally discharged, either continuously or from time to time, through line 22 for such treatment as may be desired. A hydrocarbon phase, generally substantially entirely liquid, is withdrawn from the upper portion of settler 21 through line 23, and may be passed to a depropanizer feed tank 24. This feed tank acts primarily as a surge tank, or accumulator, so that a steady flow of material to depropanizer 27 can be effected even though variations may be experienced in the operations of the equipment just discussed. In some instances a small amount of hydrofluoric acid may settle out in the bottom of this feed tank, in which case it can be returned to the alkylation system as by being passed through line 25 to line 16. If desired, feed tank 24 can be eliminated, since the subsequent handling will take care of any small amount of entrained hydrofluoric acid as well as dissolved hydrofluoric acid.

The hydrocarbon mixture, containing hydrofluoric acid, is passed through line 26 to depropanizer 27. This can be any suitable type of conventional fractional distillation column so designed and constructed that it will resist the corrosive action of hydrofluoric acid and will produce as an overhead product a substantial amount, or all, of the propane and lower-boiling hydrocarbons contained in the charge entering through line 26. Although hydrogen fluoride has a higher boiling point than propane, it forms a minimum-boiling azeotropic mixture with low-boiling paraffin hydrocarbons, as disclosed in Frey 2,322,800, issued June 29, 1943, and since the small amount which is present in the feed to the depropanizer will tend to be contained in the overhead product, an olefin-containing material is added to depropanizer 27 through line 40. In accordance with a preferred embodiment of this invention, this olefin-containing material is a propane-propylene mixture. When this fraction is substantially free from $C_2$ and lighter hydrocarbons at least a portion of it may be added at an intermediate part of depropanizer 27, such as by being added through line 41 directly to the feed line 26. However, in order to prevent contact between any ethylene which may be present and any large proportion of the hydrogen fluoride entering depropanizer 27 through line 26, it is preferred to add this material to a higher portion of the depropanizer if it contains any appreciable amount of ethylene. Such an addition may be made through line 42. A low-boiling fraction, substantially free from hydrogen fluoride, isobutane, and alkyl fluorides, and containing a substantial proportion of propane and lighter hydrocarbons introduced to depropanizer 27 through lines 26 and 40, is removed through line 43, cooler and condenser 44, and passed to reflux accumulator 45. A portion of this material is returned to the top of depropanizer 27 through line 46 as a liquid reflux and the excess is discharged from the system through line 28. In many instances the material added through line 40 will contain more propylene than is molecularly equivalent to the hydrogen fluoride concomitantly entering the depropanizer through line 26, to insure that the overhead product is essentially free from free hydrogen fluoride. In such an instance the overhead product may contain some free propylene.

The kettle product of depropanizer 27 comprises primarily isobutane, alkyl fluorides including propyl fluoride, and heavier hydrocarbons including the alkylate produced in alkylator 14. This material is withdrawn through line 30 and passed to deisobutanizer 31. A low-boiling fraction comprising primarily isobutane and a small but definite amount of alkyl fluorides, is removed as an overhead fraction through line 32, cooler and condenser 33, and passed to reflux accumulator 35. A portion of this material is returned to the top of deisobutanizer 31 through line 36 as a liquid reflux and another portion is passed through line 34 to line 13 and alkylator 14 is reintroduced into the reaction zone. This stream will comprise the desired recycled isobutane stream and will contain as alkyl fluorides both the low-boiling alkyl fluorides present in effluents from alkylator 14 and those formed from low-boiling olefins introduced to depropanizer 27 through line 40. The total amount of alkyl fluorides will generally vary from about 0.5 to about 5 per cent by volume of this recycle stream.

The kettle product from deisobutanizer 31 comprises the higher-boiling paraffin hydrocarbons produced in alkylator 14 and most of the normal butane which may be present in the effluents of the reaction zone. This material is passed from the kettle of deisobutanizer 31 through line 51 to defluorinator 52, wherein it is treated to remove any fluorine compounds which may be contained therein. This may be satisfactorily effected by contacting the stream with a fluorine-removing material, such as alumina, or bauxite, as disclosed in Frey 2,347,945, issued May 2, 1944, preferably at about the same temperature as is used in the kettle of deisobutanizer 31, as disclosed in Frey 2,403,714, issued July 9, 1946. In the event that bauxite is used and the conditions are such that there is danger of silicon tetrafluoride being present in the effluents of defluorinator 52, lime may be included as a part of the contact mass. If desired, a dehydrofluorinator may be used instead, to remove fluorine in the form of hydrogen fluoride, which can be recovered by means not shown. A substantially fluorine-free effluent is passed through line 53 to suitable separating means illustrated by fractionator 54. Normal butane is discharged from the system through line 55, a light alkylate fraction is recovered through line 56 as a product of the process, and a heavy alkylate fraction is recovered through line 57, also as a product of the process. These materials may be subjected to any desired subsequent treatment and may be blended with other motor fuel ingredients to produce a premium motor fuel, as is well known in the art.

The procedure just disclosed has an advantage of removing propane from a conventional alkylation system, insuring that the propane so removed is not contaminated with any large amount of hydrogen fluoride, and producing this result with a minimum of fractional distillation columns. In most commercial alkylation plants employing hydrogen fluoride as a catalyst, it is conventional to have one fractional distillation column, preferably fed from feed tank 24, whose primary function is to remove substantially all of the dissolved hydrogen fluoride from the effluents of the reaction zone without, at the same time, making any separation between hydrocarbon components, and the present invention permits elimination of such a distillation column. A further advantage of the present invention is that propylene can be added to the alkylation system as a reactant without first freeing it from accompanying propane and at the same time without charging propane in any large quantity to the alkylation zone. It will be appreciated, however, that my invention can be successfully and advantageously practiced by adding any suitable olefin reactant through line 40 to depropanizer 27.

Figure 2:
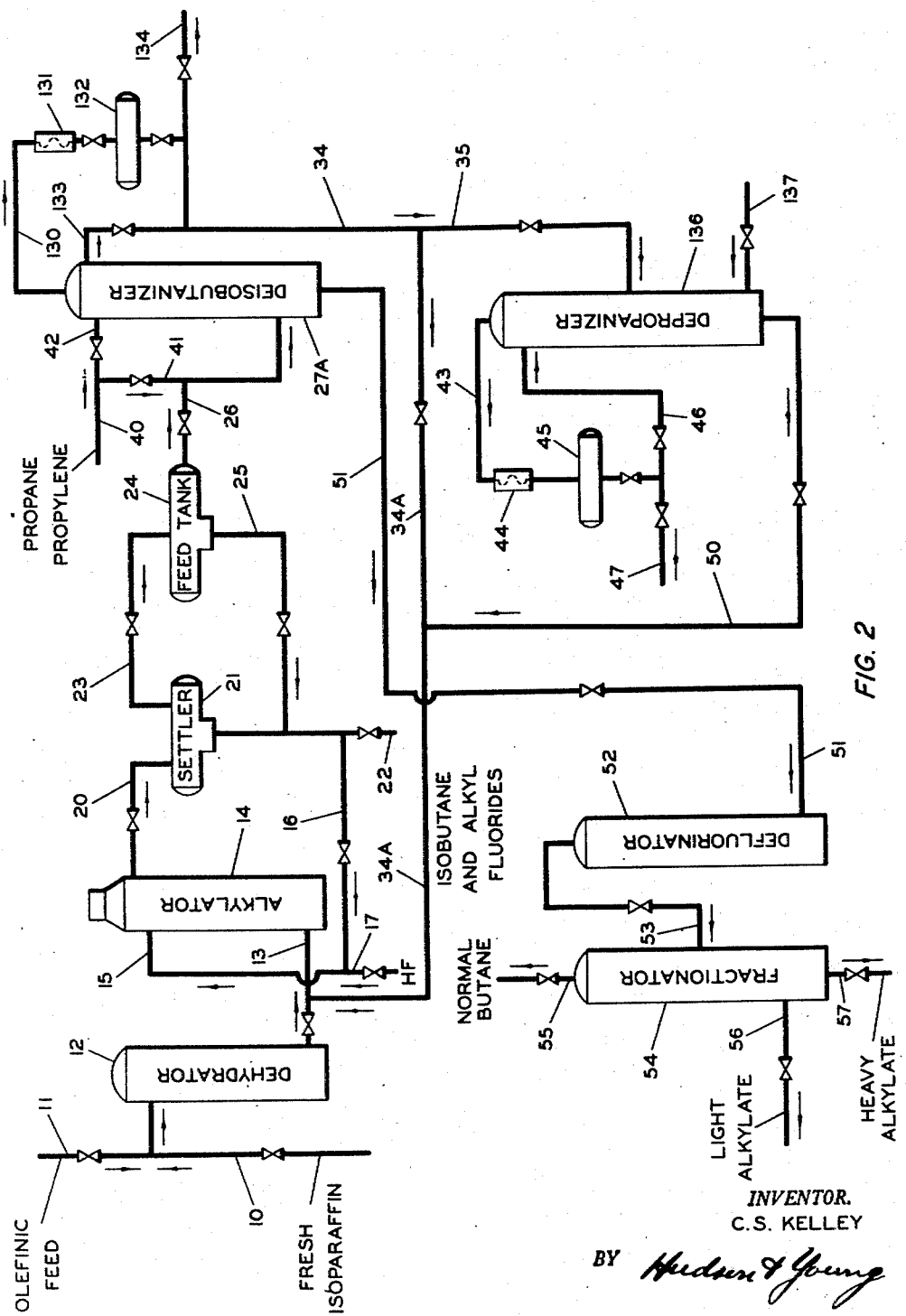

Another modification of my invention is illustrated by the flow sheet shown in Figure 2. In this flow sheet many of the items of equipment are the same as those shown in Figure 1 and discussed in connection therewith. Such common items have been referred to by the same reference numerals. In this modification, the first fractionating column to which hydrocarbon effluents of the alkylation are passed is a deisobutanizer, rather than depropanizer as in the first embodiment discussed in Figure 1. However, as in Figure 1, hydrogen fluoride is prevented from being passed overhead, as it normally would be, by introduction of a low-boiling olefin hydrocarbon and, also as in Figure 1, the combination of fractionating means employed is such as to remove from the process inert paraffin hydrocarbons accompanying such olefin, as well as similar inert paraffin hydrocarbons present from other sources in effluents of the alkylation zone.

In the embodiment illustrated in Figure 2, the hydrocarbon mixture effluent from the reaction zone, and containing a minor quantity of hydrofluoric acid, is passed through line 26 to deisobutanizer 27A. As previously discussed, this can be any suitable type of conventional fractional distillation column so designed and constructed that it will resist the corrosive action of hydrofluoric acid and will produce as an overhead product substantially all of the isobutane and lower-boiling hydrocarbons contained in the charge entering through line 26. As discussed in connection with Figure 1, an olefin-containing material is added to deisobutanizer 27A through line 40 and in accordance with a preferred embodiment of this specific modification, this olefin containing material is a propane-propylene mixture which may or may not contain some ethane and ethylene. The operation is substantially as has been discussed in connection with depropanizer 27 of Figure 1. A low-boiling fraction, substantially free from free hydrogen fluoride and containing isobutane and lighter hydrocarbons and alkyl fluorides, is removed as a low-boiling fraction through line 130, cooler and condenser 131 and passed to reflux accumulator 132. A portion of this material is returned to the top of deisobutanizer 27A through line 133 as a liquid reflux. If desired, a portion of this stream may be discharged from the process through line 134, but this will generally not be done. A further portion of this overhead fraction is passed through line 34 and line 35 to depropanizer 136. If desired, a portion of this material may be passed directly to line 13 and alkylator 14 through line 34A.

Depropanizer 136 is operated so as to separate a low-boiling fraction substantially free from hydrogen fluoride, isobutane and alkyl fluorides and containing a substantial proportion of propane and lighter hydrocarbons introduced to deisobutanizer 27A through lines 26 and 40. This low-boiling fraction is removed through line 43, cooler and condenser 44 and passed to reflux accumulator 45. A portion of this material is returned to the top of depropanizer 136 through line 46 as a liquid reflux and the excess is discharged from the system through line 47. It will be appreciated that in this respect the operation of depropanizer 136 is substantially the same as the operation of the corresponding portion of depropanizer 27 in Figure 1. The kettle product of depropanizer 136 comprises primarily isobutane and alkyl fluorides including propyl fluoride. This material is withdrawn through line 50 and passed to lines 34A and 13 for introduction into alkylator 14. In some instances alkyl fluorides present in the kettle or lower portion of depropanizer 136 will tend to decompose and release free hydrogen fluoride. In order to inhibit such an undesired reaction, it may be desirable to add olefins, particularly butylenes, to a low portion of depropanizer 136 as through line 137.

The kettle product from deisobutanizer 27A has substantially the same composition as the kettle product from deisobutanizer 31 in Figure 1. This high-boiling fraction is passed through line 51 to defluorinator 52 and is subsequently treated therein and in fractionator 54 as has been discussed in connection with the same equipment in Figure 1.

A further modification of my invention is shown in Figure 3 where again much of the equipment is quite similar to the equipment illustrated in Figures 1 and 2, and corresponding pieces of equipment have been identified by the same numerals and are operated as previously described. In this modification, as in the modification shown in Figure 1, an olefin hydrocarbon is added to the material undergoing distillation in the depropanizer, but the depropanizer is not the first fractional distillation column to which effluents of the alkylation reaction zone are passed.

In this modification, the hydrocarbon mixture containing hydrofluoric acid is passed through line 26 to debutanizer 127. In this debutanizer normal butane and lower-boiling material, including free hydrogen fluoride, is removed as a low-boiling fraction and a hydrocarbon fraction higher-boiling than normal butane and containing products of the alkylation is removed as a high-boiling fraction. The operation of debutanizer 127 is substantially the same as that of deisobutanizer 27A in Figure 2, with the above exceptions, and without the introduction of olefin hydrocarbons. Liquid reflux is returned through line 133 and a portion is passed through line 35 to deisobutanizer 100. Since the hydrocarbon material passing through line 26 is at least a saturated solution of hydrogen fluoride in hydrocarbons, and since a substantial portion of this hydrocarbon material is too high boiling to be present in the overhead fraction, there will be present more than sufficient hydrogen fluoride to form a saturated solution, and as a result some separated liquid hydrogen fluoride will settle out in the bottom of reflux accumulator 132. This material, together with any desired portion of the isobutane rich liquid, is removed from the bottom of accumulator 132 through line 34 and returned to line 13 and alkylator 14 for reintroduction into the reaction zone. If desired, any portion of the liquid hydrocarbon material present in accumulator 132 may be discharged from the system through line 134, though this normally will not be done.

Deisobutanizer 100 is operated so as to discharge a normal butane fraction as a high-boiling fraction through line 101. A low-boiling fraction comprising isobutane and lower-boiling hydrocarbons and free hydrogen fluoride is passed through line 137, cooler and condenser 138 to reflux accumulator 139. A portion of this fraction is returned to the top of deisobutanizer 100 through line 140 as a liquid reflux and another portion is passed through line 141 to depropanizer 136. Depropanizer 136 operates in essentially the same manner as depropanizer 27 of Figure 1 except that the kettle product is substantially free from normal butane. Corresponding parts of depropanizer 136 and depropanizer 27 have been designated by the same numerals and the operation is otherwise as previously discussed. A fraction comprising isobutane and alkyl fluorides, including propyl fluoride, is removed as a high-boiling fraction through line 50 and passed to alkylator 14 through lines 34 and 13.

The high-boiling fraction from debutanizer 127 is passed through line 51 to defluorinator 52. Except that this fraction is substantially free from normal butane, it corresponds in composition to the fraction passed to defluorinator 52 in Figure 1 and is subjected to substantially the same treatment as previously discussed for the corresponding fraction in connection with Figure 1.

Figure 3:
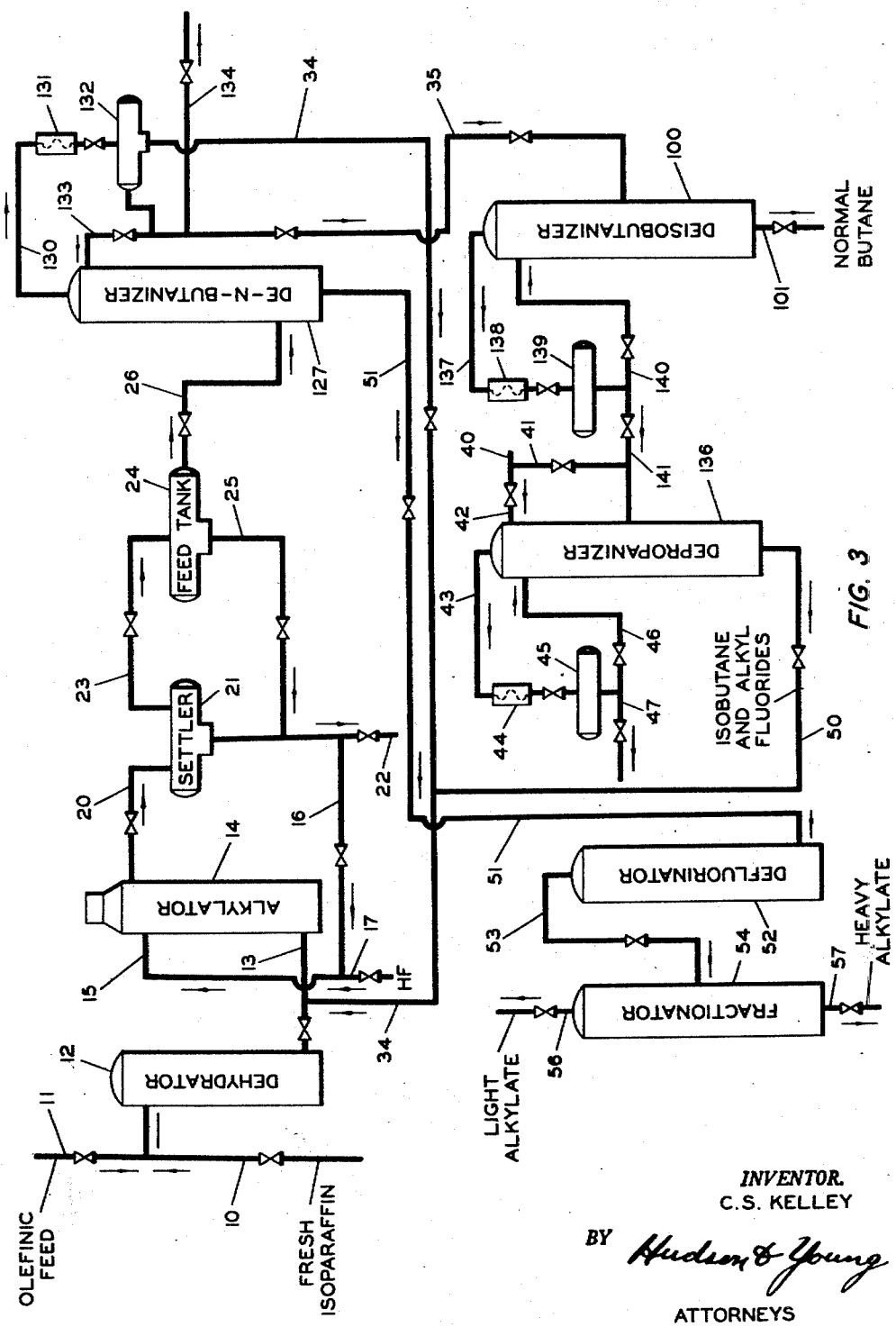

If the stream introduced through line 40 in the modification of Figure 3 should contain large amounts of other inert paraffin hydrocarbons, such as a normal butane, one of the advantageous features of my invention will not be fully realized since such an inert material will be contained in the stream removed through line 50 and introduced into the alkylator 14, and will not be eliminated from the system through line 47 as is the propane and any ethane or lighter-hydrocarbons which may accompany propylene introduced through line 40. However, it is possible to operate successfully when the content of normal butane is not excessive, when an isobutane-olefin stream, is introduced through line 40, when an isopentane-olefin stream is introduced through line 40, or when other olefin-containing streams containing no more than small amounts of high-boiling inert paraffins are available and so introduced. In the modifications of Figures 1 and 2, however, the various fractionating means are so arranged that there is an opportunity to handle such olefin-containing streams, containing larger quantities of high-boiling inert paraffin hydrocarbons, successfully.

One advantage of the modifications shown in Figures 1 and 3 is that it is possible to charge a mixture of ethylene and propylene and/or higher-boiling olefins through lines 40 and 42 and to remove, through line 28 of Figure 1, or line 47 of Figure 3 therefore, a hydrocarbon stream containing ethylene with a substantially smaller content, or substantially free, of higher-boiling olefin hydrocarbons. Thus, it is possible to operate these modifications in connection with other processes where relatively pure ethylene is desired and put to a useful purpose in alkylator 14 the propylene and/or higher-boiling olefins which often accompany the ethylene and are sometimes difficultly removed therefrom. An example of such another process is reaction of ethylene with isobutane in the presence of an aluminum halide catalyst to produce diisopropyl where it is desired that the ethylene be relatively free from higher-boiling olefins. The material removed through line 28 of Figure 1, or 47 of Figure 3 therefore, is well suited for the olefin charge to such a process when the corresponding depropanizer is so operated that substantially all of the propylene introduced through line 40 is reacted to form propyl fluoride. Such a procedure is particularly useful for separating a low-boiling olefin from a higher-boiling olefin, particularly from one having not more than five carbon atoms per molecule and having at least one more carbon atoms per molecule than said low-boiling olefin.

EXAMPLE I

The following illustrates the operation of one modification of my invention, reference being made to Figure 1 for identification of the various streams and units of equipment.

Isobutane, introduced through line 10, is reacted with olefins contained in a butene-amylene feed stream produced by other refinery operations, introduced through line 11. The operation is as discussed in connection with Figure 1, and compositions and quantities of various streams are as indicated in Table I.

*Table I*

| Line | 10 | 11 | 26 | 42 | 30 | 28 | 34 | 53 |
|---|---|---|---|---|---|---|---|---|
| Vol., Bbls./day | 1,450 | 3,000 | 12,137 | 1,085 | 12,220 | 965 | 8,080 | 4,140 |
| Composition, percent liq. vol.: | | | | | | | | |
| HF | | | 0.3 | | | | | |
| Alky Fluoride | | | | 1.2 | | | 1.8 | |
| Ethylene | | | | 1.0 | | 1.1 | | |
| Ethane | | | | 4.6 | | 5.2 | | |
| Propylene | | | | 20.7 | | 7.8 | | |
| Propane | | 0.8 | 3.7 | 73.7 | | 3.4 | 5.2 | |
| Isobutane | 91 | 8.3 | 49.6 | | 49.1 | 85.4 | 73.8 | 1.2 |
| N-Butane | 9 | 26.7 | 20.4 | | 20.4 | 0.5 | 19.2 | 22.4 |
| Butylenes | | 23.9 | | | | | | |
| Amylenes | | 13.3 | | | | | | |
| Pentanes | | 27.0 | 8.2 | | 8.2 | | | 24.2 |
| C₆ and Heavier | | | 17.8 | | 17.7 | | | 52.2 |
| Total | 100 | 100.0 | 100.0 | 100.0 | 100.0 | 100.0 | 100.0 | 100.0 |

EXAMPLE II

The following illustrates the operation of another modification of my invention, reference being made to Figure 3 for identification of the various streams and units of equipment. In this example the charge stock and alkylation, per se, are the same as in Example I, the entire difference over Example I being in the subsequent separation steps. The operation is as discussed in connection with Figure 3, and compositions and quantities of various streams are as indicated in Table II.

*Table II*

| Line | 10 | 11 | 26 | 35 | 51 | 141 | 42 | 47 | 50 |
|---|---|---|---|---|---|---|---|---|---|
| Vol., Bbls./day | 1,450 | 3,000 | 12,137 | 8,977 | 3,160 | 7,997 | 1,085 | 965 | 8,080 |
| Composition, percent liq. vol.: | | | | | | | | | |
| HF | | | 0.3 | 0.4 | | 0.5 | | | |
| Alkyl fluoride | | | | | | | 1.0 | 1.1 | 1.8 |
| Ethylene | | | | | | | 4.6 | 5.2 | |
| Ethane | | | | | | | 20.7 | 7.8 | |
| Propylene | | | | | | | | | |
| Propane | | 0.8 | 3.7 | 5.0 | | 5.6 | 73.7 | 85.4 | 5.2 |
| Isobutane | 91 | 8.3 | 49.6 | 67.0 | | 74.6 | | 0.5 | 73.8 |
| N-Butane | 9 | 26.7 | 20.4 | 27.6 | | 19.3 | | | 19.2 |
| Butylenes | | 23.9 | | | | | | | |
| Amylenes | | 13.3 | | | | | | | |
| Pentanes | | 27.0 | 8.2 | | 31.6 | | | | |
| C₆ and Heavier | | | 17.8 | | 68.4 | | | | |
| Total | 100 | 100.0 | 100.0 | 100.0 | 100.0 | 100.0 | 100.0 | 100.0 | 100.0 |

It will be appreciated that various modifications of my invention can be practiced, by one skilled in the art, without departing from the scope or spirit of the teachings and disclosure, and without departing from the scope of the claims.

I claim:

1. An improved process for reacting isobutane and low-boiling olefin hydrocarbons in the presence of a hydrogen fluoride catalyst, to produce higher-boiling paraffin hydrocarbons, which comprises reacting isobutane and a low-boiling olefin in a reaction zone in the presence of a hydrogen fluoride catalyst, separating from effluents of said reaction zone a liquid phase comprising primarily hydrogen fluoride catalyst and a hydrocarbon phase comprising unreacted isobutane and resulting higher-boiling paraffin hydrocarbons together with a minor amount of hydrogen fluoride, passing said hydrocarbon phase to a first fractional distillation means, introducing also into said first distillation means a propane-propylene mixture containing sufficient propylene to react with all said hydrogen fluoride and form propyl fluoride, removing from said first means a low-boiling fraction which is substantially free from free hydrogen fluoride and which comprises essentially hydrocarbons lower-boiling than isobutane and contains substantially all of the propane contained in said added propane-propylene mixture and also at least a portion of any propane contained in said hydrocarbon phase, removing also from said first distillation means a high-boiling fraction comprising unreacted isobutane and higher-boiling paraffin hydrocarbons produced in said reaction zone and alkyl fluoride and passing same to a second fractional distillation means, removing from said second means a low-boiling fraction comprising isobutane and propyl fluoride and passing same to said reaction zone, and recovering also from said second means a high-boiling fraction comprising high-boiling paraffin hydrocarbons as a product of the process.

2. An improved process for reacting a low-boiling isoparaffin hydrocarbon with an alkylating reactant to produce higher-boiling paraffin hydrocarbons, which comprises reacting a low-boiling isoparaffin and an alkylating reactant in a reaction zone in the presence of a hydrogen fluoride catalyst, separating from effluents of said reaction zone a hydrocarbon phase comprising unreacted low-boiling isoparaffin and resulting higher-boiling paraffin hydrocarbons together with a minor amount of hydrogen fluoride, passing said hydrocarbon phase to a first fractional distillation means, introducing also into said first distillation means a propane-propylene mixture containing sufficient propylene to react with all said hydrogen fluoride and form propyl fluoride, removing from said first means a low-boiling fraction which is substantially free from free hydrogen fluoride and which comprises essentially propane and lower-boiling hydrocarbons, recovering from said first distillation means a high-boiling fraction comprising unreacted low-boiling isoparaffin and higher-boiling paraffin hydrocarbons produced in said reaction zone and alkyl fluoride and passing same to a second fractional distillation means, recovering from said second means a low-boiling fraction comprising low-boiling isoparaffin reactant and propyl fluoride and passing same to said reaction zone, and recovering also from said second means a high-boiling fraction comprising high-boiling paraffin hydrocarbons as a product of the process.

3. An improved process for reacting a low-boiling isoparaffin hydrocarbon with an alkylating reactant to produce higher-boiling paraffin hydrocarbons, which comprises reacting a low-boiling isoparaffin and an alkylating reactant in a reaction zone in the presence of a hydrogen fluoride catalyst, separating from effluents of said reaction zone a hydrocarbon phase comprising unreacted low-boiling isoparaffin and resulting higher-boiling paraffin hydrocarbons together with a minor amount of hydrogen fluoride, passing said hydrocarbon phase to a first fractional distillation means, introducing into said first distillation means an olefinic hydrocarbon material of which no olefin forms a corresponding alkyl fluoride having a higher boiling point than said low-boiling isoparaffin reactant, said material containing sufficient olefin to react with all said hydrogen fluoride and form the corresponding alkyl fluoride, removing from said first means a high-boiling fraction comprising unreacted isoparaffin and higher-boiling paraffins produced in said reaction zone and resulting alkyl fluoride and passing same to a second fractional distillation means, removing from said second means a low-boiling fraction comprising said isoparaffin reactant and alkyl fluoride produced from said added olefin and passing same to said reaction zone, and removing also from said second means a high-boiling fraction comprising high-boiling paraffin hydrocarbons as a product of the process.

4. In a process for reacting a low-boiling alkylatable hydrocarbon and an alkylating reactant to produce higher-boiling hydrocarbons, the improvement which comprises passing a liquid hydrocarbon material comprising low-boiling hydrocarbon effluents of such a reaction and including higher-boiling hydrocarbon products and containing dissolved hydrogen fluoride to a first fractional distillation means, introducing into material undergoing distillation in said first means a low-boiling olefinic hydrocarbon material of which no olefin forms a corresponding alkyl fluoride having a higher boiling point than said low-boiling alkylatable hydrocarbon, said material containing sufficient olefin to react with all hydrogen fluoride associated with said hydrocarbon effluents and form the corresponding alkyl fluoride, removing from said first means a high-boiling fraction comprising unreacted alkylatable hydrocarbon and higher-boiling hydrocarbons produced in said reaction and resulting alkyl fluoride and passing same to a second fractional distillation means, removing from said second means a low-boiling fraction comprising said alkylatable hydrocarbon and alkyl fluoride produced from said added olefin and passing same to an alkylation reaction, and removing also from said second means a high-boiling fraction comprising higher-boiling hydrocarbons produced by said reaction as a product of the process.

5. An improved process for reacting isobutane and low-boiling olefin hydrocarbons in the presence of a hydrogen fluoride catalyst, to produce higher-boiling paraffin hydrocarbons, which comprises reacting isobutane and a low-boiling olefin in a reaction zone in the presence of a hydrogen fluoride catalyst, separating effluents of said reaction zone into a liquid phase comprising primarily hydrogen fluoride catalyst and a liquid hydrocarbon phase comprising unreacted isobutane and resulting higher-boiling paraffin hydrocarbons together with hydrogen fluoride dissolved therein, passing said liquid hydrocarbon phase to a first fractional distillation means, introducing into the top of said distillation means a propane-propylene mixture which also contains ethylene, in an amount such that there is sufficient propylene to react with said hydrogen fluoride and form propyl fluoride, removing from said first means a low-boiling fraction which is substantially free from hydrogen fluoride and which comprises essentially hydrocarbons lower boiling than isobutane and contains a higher ratio of ethylene to propylene than said propane-propylene fraction, removing also from said first distillation means a high-boiling fraction comprising unreacted isobutane and higher-boiling paraffin hydrocarbons produced in said reaction zone and propyl fluoride and passing same to a second fractional distillation means, removing from said second means a low-boiling fraction comprising isobutane and propyl fluoride and passing same to said reaction zone, and recovering also from said second means a high-boiling fraction comprising high-boiling paraffin hydrocarbons as a product of the process.

CARL S. KELLEY.

REFERENCES CITED

The following references are of record in the file of this patent:

UNITED STATES PATENTS

| Number | Name | Date |
| --- | --- | --- |
| 2,220,713 | Grosse et al. | Nov. 5, 1940 |
| 2,320,629 | Matuszak | June 1, 1943 |
| 2,328,275 | Heard | Aug. 31, 1943 |
| 2,342,677 | Linn | Feb. 29, 1944 |
| 2,371,341 | Matuszak | Mar. 13, 1945 |
| 2,392,739 | Horeczy et al. | Jan. 8, 1946 |
| 2,399,368 | Matuszak | Apr. 30, 1946 |
| 2,412,726 | Frey | Dec. 17, 1946 |
| 2,417,875 | Leonard | Mar. 25, 1947 |
| 2,425,745 | Leonard et al. | Aug. 19, 1947 |
| 2,448,601 | Kelley | Sept. 7, 1948 |
| 2,448,620 | Reading et al. | Sept. 7, 1948 |